United States Patent
Eickemeyer et al.

(10) Patent No.: US 8,140,829 B2
(45) Date of Patent: Mar. 20, 2012

(54) MULTITHREADED PROCESSOR AND METHOD FOR SWITCHING THREADS BY SWAPPING INSTRUCTIONS BETWEEN BUFFERS WHILE PAUSING EXECUTION

(75) Inventors: Richard James Eickemeyer, Rochester, MN (US); David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1450 days.

(21) Appl. No.: 10/717,747

(22) Filed: Nov. 20, 2003

(65) Prior Publication Data

US 2005/0114856 A1    May 26, 2005

(51) Int. Cl.
G06F 9/30 (2006.01)
G06F 9/40 (2006.01)
G06F 7/38 (2006.01)
G06F 9/00 (2006.01)
G06F 9/44 (2006.01)

(52) U.S. Cl. .......... 712/214; 712/215; 712/220
(58) Field of Classification Search .......... 712/214
See application file for complete search history.

(56) References Cited

U.S. PATENT DOCUMENTS

| | | | |
|---|---|---|---|
| 4,092,937 A | 6/1978 | Landau et al. | |
| 4,831,623 A | 5/1989 | Terzian | |
| 5,907,702 A * | 5/1999 | Flynn et al. | 718/108 |
| 5,933,627 A * | 8/1999 | Parady | 712/228 |
| 5,987,258 A | 11/1999 | Daniel et al. | |
| 6,208,361 B1 * | 3/2001 | Gossett | 345/536 |
| 6,295,600 B1 | 9/2001 | Parady | |
| 6,314,511 B2 * | 11/2001 | Levy et al. | 712/217 |
| 6,430,083 B1 | 8/2002 | Lu et al. | |
| 6,438,671 B1 * | 8/2002 | Doing et al. | 711/173 |
| 6,957,326 B1 * | 10/2005 | Redington et al. | 712/228 |
| 2003/0135711 A1 * | 7/2003 | Shoemaker et al. | 712/200 |
| 2005/0022196 A1 * | 1/2005 | Davis et al. | 718/100 |
| 2005/0081018 A1 * | 4/2005 | Luick | 712/218 |

OTHER PUBLICATIONS

Luick, IBM U.S. Appl. No. 10/682,134, filed Oct. 9, 2003, "Multithreaded Processor and Method for Fast Context Switch".
Ali Elkateeb, "The impact of using the RISC Architecture in the Network Nodes Processor", 1997, IEEE, pp. 540-544.
Microsoft Computer Dictionary, 1999, Microsoft Press, Fourth Edition, p. 50.

* cited by examiner

Primary Examiner — David Huisman
Assistant Examiner — George Giroux
(74) Attorney, Agent, or Firm — Martin & Associates LLC; Bret J. Petersen (57) ABSTRACT

A processor includes primary threads of execution that may simultaneously issue instructions, and one or more backup threads. When a primary thread stalls, the contents of its instruction buffer may be switched with the instruction buffer for a backup thread, thereby allowing the backup thread to begin execution. This design allows two primary threads to issue simultaneously, which allows for overlap of instruction pipeline latencies. This design further allows a fast switch to a backup thread when a primary thread stalls, thereby providing significantly improved throughput in executing instructions by the processor.

20 Claims, 6 Drawing Sheets

MULTITHREADED PROCESSOR AND METHOD FOR SWITCHING THREADS BY SWAPPING INSTRUCTIONS BETWEEN BUFFERS WHILE PAUSING EXECUTION

RELATED APPLICATION

This application is related to U.S. patent application "REGISTER FILE BIT AND METHOD FOR FAST CONTEXT SWITCH" Ser. No. 10/682,134, filed on Oct. 09, 2003, which is incorporated herein by reference.

BACKGROUND OF THE INVENTION

1. Technical Field

This invention generally relates to data processing, and more specifically relates to switching between threads in a multithreaded processor.

2. Background Art

In modern computer systems, multithreading has been used to keep high frequency processors from being idle a majority of the time. In general, this is accomplished by allowing multiple threads to execute at once on a single physical processor. In a two-threaded system, when a first thread stalls (e.g., after encountering a cache miss), the context is changed to the second thread, and execution of the second thread continues.

Different types of multithreading are known in the art. Hardware multithreading, also known as coarse-grain multithreading, allows only one thread to issue instructions at one time. Due to the presence of multiple threads, the effect of cache miss latencies may be minimized by performing a thread switch whenever a cache miss occurs. However, because there is only a single instruction pipeline, hardware multithreading does not benefit from any overlapping latencies in the instruction pipeline. Simultaneous multithreading, also known as fine-grain multithreading, allows multiple threads to issue instructions at one time. Simultaneous multithreading requires separate resources for each active thread. Each thread typically has its own instruction buffer, register file, etc. As a result, simultaneous multithreading improves not only cache miss latencies, but also provides overlapping latencies in the different instruction pipelines for each thread. Note, however, that this increased performance comes at a significant cost in hardware due to the separate resources that are required for each thread. Providing two threads in a simultaneously multithreaded processor is relatively straightforward. Two sets of general purpose registers are provided, two sets of instruction buffers are provided, etc. When execution of one thread stalls, the other thread is executed. However, providing more than two threads significantly complicates a processor with simultaneous multithreading. If there are four threads, for example, four sets of general purpose registers, four instruction buffers, etc. are required. It is an extremely complicated problem to simultaneously issue instructions from three or more threads, and this also would require several additional pipeline issue stages. When execution of one thread stalls, how is it decided which of the three other threads should now execute? The answer is unclear, and complex to implement in hardware. As a result, there have been limited efforts in the prior art to extend simultaneous multithreading beyond two threads.

Figure 1:
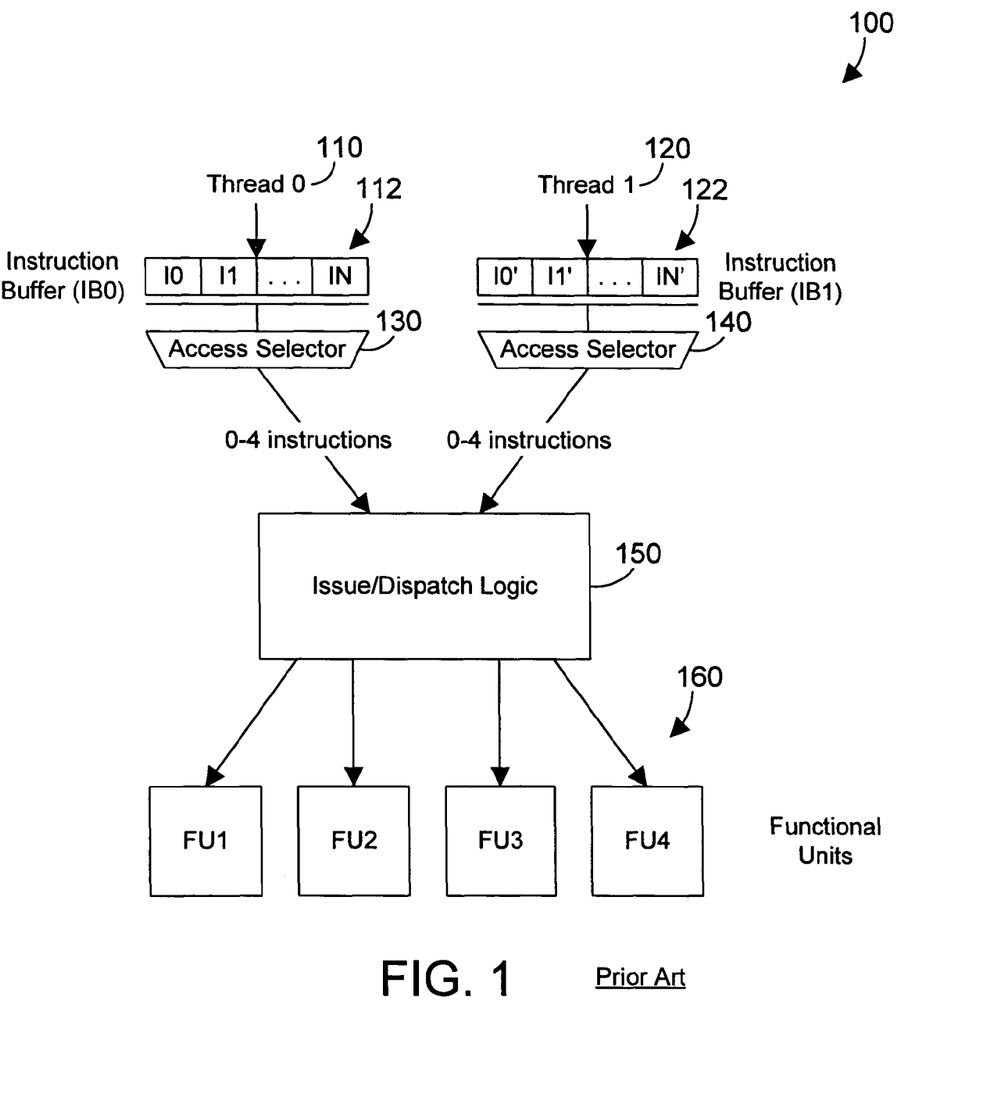
FIG. 1 is a block diagram of a prior art configuration for a two threaded processor.

A prior art processor 100 that has two threads in a simultaneous multithreading configuration is shown in FIG. 1. Each thread 110, 120 has its own instruction buffer 112, 122, respectively. The issue/dispatch logic 150 receives instructions from the instruction buffers 112 and 122 via respective access selectors 130 and 140, and issues the instructions to a plurality of functional units 160. If one of the threads 110, 120 stalls, execution of the non-stalled thread may hopefully continue.

Threads 110 and 120 are simultaneously multi-threaded, which means that each of these threads preferably has its own instruction buffer and register state. Issue/dispatch logic 150 may thus issue instructions from both threads 110 and 120 at the same time to the functional units 160.

As the clock frequency of modern processors increases, cache and memory latencies are becoming longer relative to the processor cycle. As a result, in a typical simultaneous two-threaded system as shown in FIG. 1, there is just too much time when both threads are stalled. New multithreading schemes have been proposed with four or more threads extent at one time. Implementing more simultaneous threads can theoretically provide more gains by overlapping the latencies. However, as discussed above, adding additional simultaneous threads greatly adds to the complexity of the design. In addition, the number of required registers is proportional to the number of simultaneous threads. As a result, known simultaneous multithreading techniques make handling more than two simultaneous threads very difficult and costly. Without an improved way for multithreading that supports more than two threads, the computer industry will continue to suffer from excessively expensive ways of providing more than two threads of execution in a processor.

DISCLOSURE OF INVENTION

A processor includes primary threads of execution that may simultaneously issue instructions, and one or more backup threads. When a primary thread stalls, the contents of its instruction buffer may be switched with the instruction buffer for a backup thread, thereby allowing the backup thread to begin execution. This design allows two primary threads to issue simultaneously, which allows for overlap of instruction pipeline latencies. This design further allows a fast switch to a backup thread when a primary thread stalls, thereby providing significantly improved throughput in executing instructions by the processor.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 2:
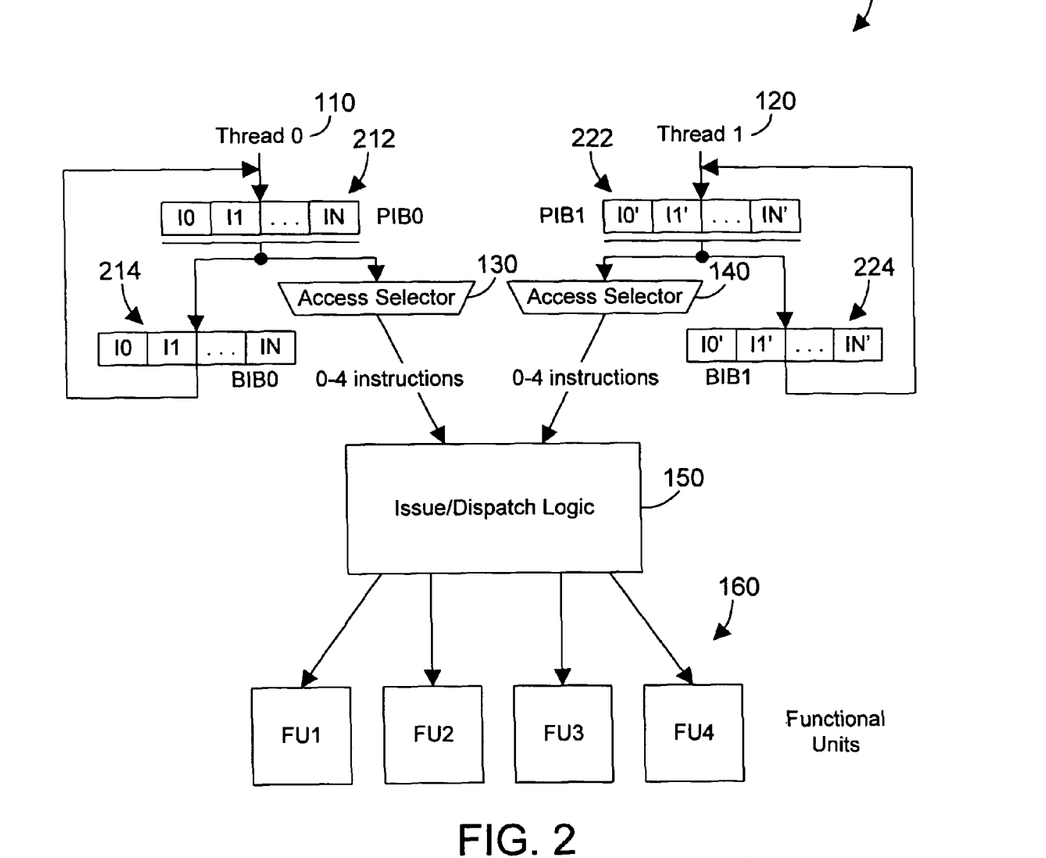
FIG. 2 is a block diagram of a processor in accordance with a first embodiment that includes a backup thread for each simultaneous thread.

Referring to FIG. 2, a processor 200 in accordance with a first embodiment of the present invention includes the access selectors 130, 140, the issue/dispatch logic 150, and the plurality of functional units 160 shown in the prior art processor 100 of FIG. 1. Thread 110 includes a primary instruction buffer PIB0 212 and a backup instruction buffer BIB0 214. In similar fashion, thread 120 includes a primary instruction buffer PEB1 222 and a backup instruction buffer BIB1 224. The PIB0 212 and BIB0 214 may be implemented using a set/reset latch (SRL) that includes a first level (L1) latch coupled to a second level (L2) latch, with a PIB0 bit residing in the L1 latch, and the BIB0 bit residing in the L2 latch. In similar fashion, the PIB1 222 and BIB1 224 could be implemented using SRLs. Ofttimes the primary instruction buffers already have an L2 latch that is used for scan testing. This L2 latch could also be used as the backup instruction buffer, making the implementation of the backup instruction buffers very inexpensive.

Processor 200 of FIG. 2 provides an inexpensive way to use four threads at a time by allowing only two of the four to issue instructions at one time, and by providing an inexpensive way to switch between a currently-issuing thread and a backup thread. Processor 200 thus provides a hybrid 2×2 multithreading scheme that allows four threads to be used without significantly increasing the expense of processor 200. This 2×2 hybrid multithreading scheme requires a way to quickly change state from an active thread to a backup thread. This changing of state requires a register file that may be quickly changed between two states. Such a register file arrangement is disclosed in the related application, U.S. patent application "REGISTER FILE BIT AND METHOD FOR FAST CONTEXT SWITCH" Ser. No. 10/682,134, filed on Oct. 09, 2003, which has been incorporated herein by reference. By providing the register file of the related application with the scheme of swapping primary and backup buffers disclosed herein, a processor may make very fast context switches when a thread stalls.

Figure 3:
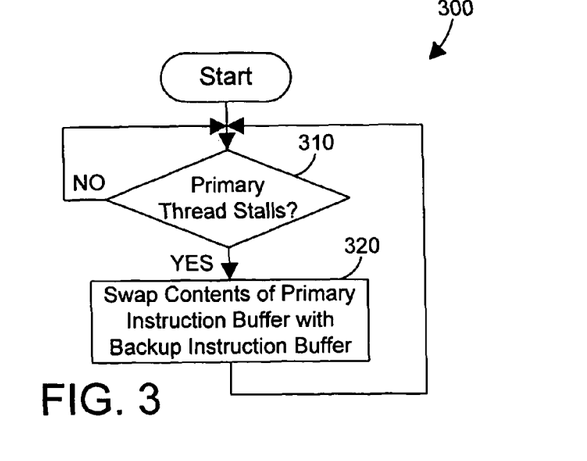
FIG. 3 is a flow diagram of a method in accordance with the first embodiment that is performed by the processor in FIG. 2.

FIG. 3 shows a method in accordance with the first embodiment that is performed by processor 200 in FIG. 2. Method 300 waits (step 310=NO) until a primary thread stalls (step 310=YES). Once a primary thread stalls, the contents of the primary instruction buffer are swapped with the contents of the backup instruction buffer (step 320). Method 300 applies to both threads 110 and 120 in FIG. 2. Thus, if primary thread 110 stalls (step 310=YES), the contents of the primary instruction buffer PIB0 212 are swapped with the contents of the backup instruction buffer BIB0 214 (step 320). In similar fashion, if primary thread 120 stalls (step 310=YES), the contents of the primary instruction buffer PIB1 222 are swapped with the contents of the backup instruction buffer BIB1 224 (step 320). Swapping the contents of the primary and backup instruction buffers essentially performs a switch from an active thread to an inactive thread. The processor 200 thus provides a hybrid type of multithreading. Primary threads 110 and 120 are simultaneously multithreaded, and thus issue/dispatch logic 150 may issue instructions for both of these threads to the functional units 160 at the same time. The two backup threads corresponding to backup instruction buffers 214 and 224 are inactive threads until their respective primary thread stalls, at which time the primary (active) and inactive threads are swapped. Thus, thread 110 and the inactive thread corresponding to the backup instruction buffer 214 are hardware multithreaded, and thread 120 and the inactive thread corresponding to the backup instruction buffer 224 are hardware multithreaded. This hybrid combination of simultaneous and hardware multithreading provides a very powerful solution that benefits from the advantages of both without the complexity of providing simultaneous multithreading for all four threads.

Figure 4:
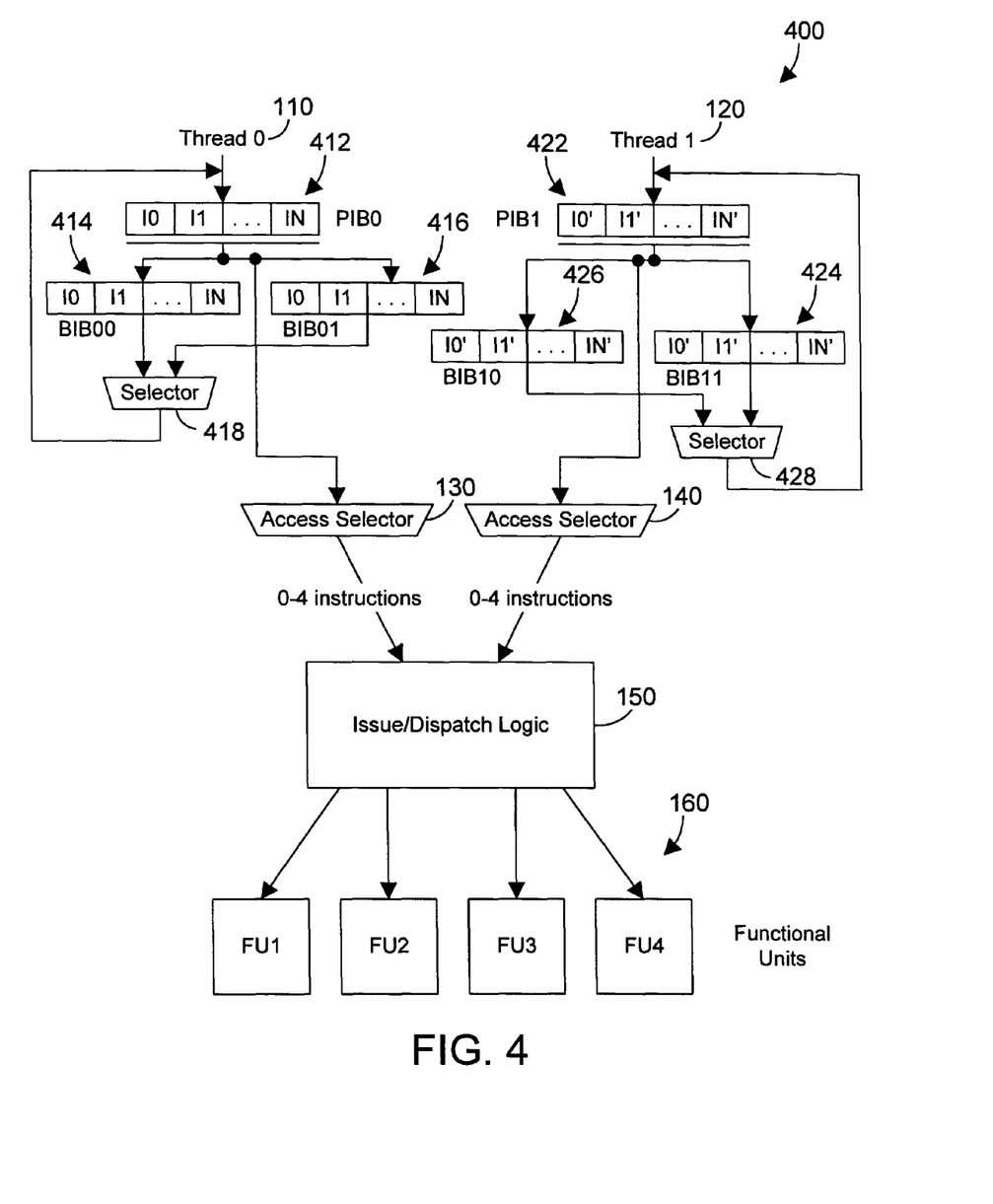
FIG. 4 is a block diagram of a processor in accordance with a second embodiment that includes multiple backup threads for each simultaneous thread.

Referring to FIG. 4, a processor 400 in accordance with a second embodiment of the present invention includes the access selectors 130, 140, the issue/dispatch logic 150, and the functional units 160 shown in FIGS. 1 and 2. Processor 400 of FIG. 4 allows for more threads than processor 200 of FIG. 2 by providing multiple backup threads for each primary thread. Thus, primary thread 110 has a primary instruction buffer PIB0 412 and two backup instruction buffers 414 and 416. In similar fashion, primary thread 120 has a primary instruction buffer PIB1 422 and two backup instruction buffers 424 and 426. When a primary thread stalls, one of the backups threads is selected, and the contents of the primary thread instruction buffer is swapped with the contents of the selected backup instruction buffer that corresponds to the selected thread.

Figure 5:
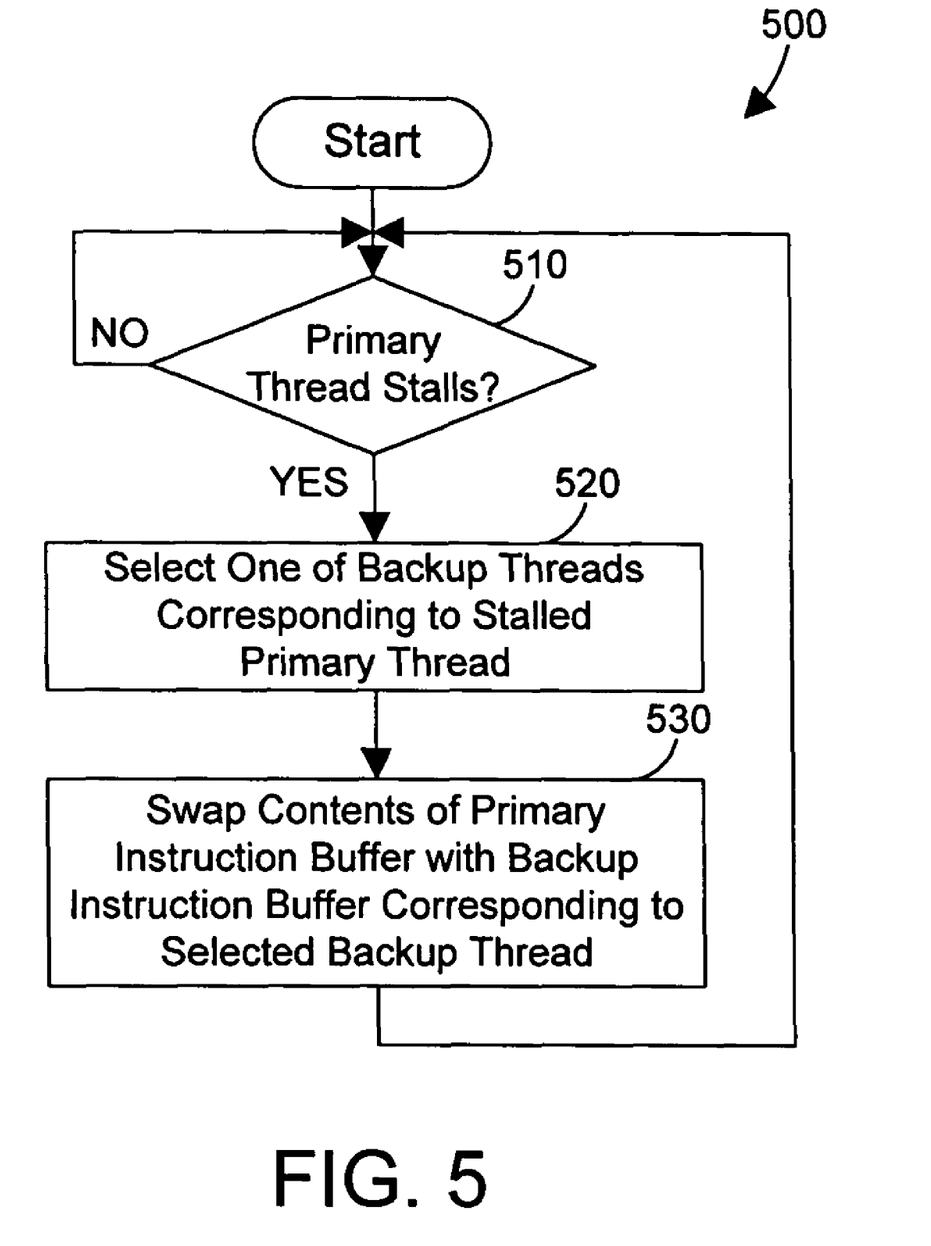
FIG. 5 is a flow diagram of a method in accordance with the second embodiment that is performed by the processor in FIG. 4.

Referring to FIG. 5, a method 500 in accordance with the second embodiment is performed by processor 400 in FIG. 4. Method 500 waits (step 510=NO) until a primary thread stalls (step 510=YES). One of the backup threads corresponding to the stalled primary thread is then selected (step 520). The contents of the primary instruction buffer are then swapped with the contents of the backup instruction buffer corresponding to the selected backup thread (step 530). Thus, if thread 110 stalls (step 510=YES), one of the two backup threads corresponding to the backup instruction buffers 414 and 416 are selected (step 520). Note that the selection of backup thread provides the control input to the selector 418 to select the appropriate backup instruction buffer. We assume for the sake of illustration that the backup thread corresponding to backup instruction buffer 416 is selected in step 520. The contents of the primary instruction buffer 412 and the corresponding backup instruction buffer 416 are then swapped (step 530). In similar fashion, the primary instruction buffer 422 may be swapped with either of the backup instruction buffers 424 and 426, depending on which one is selected in step 520 (which determines which is selected by selector 428 to feed back to the primary instruction buffer 422). By providing multiple backup threads, the chances of increasing processor utilization increase without significantly adding to system overhead caused by thread swapping.

While processor 400 of FIG. 4 shows two backup threads for each primary thread, the preferred embodiments expressly extend to any and all numbers and combinations of backup threads. For example, one primary thread could have one backup buffer, while the second primary thread could have three backup buffers. In the alternative, each primary thread could have four backup buffers. In addition, more than two simultaneous threads may be provided, with each having one or more backup threads. Many variations of thread numbers and combinations for processor 400 are possible, and all lie within the scope of the second embodiment.

Figure 6:
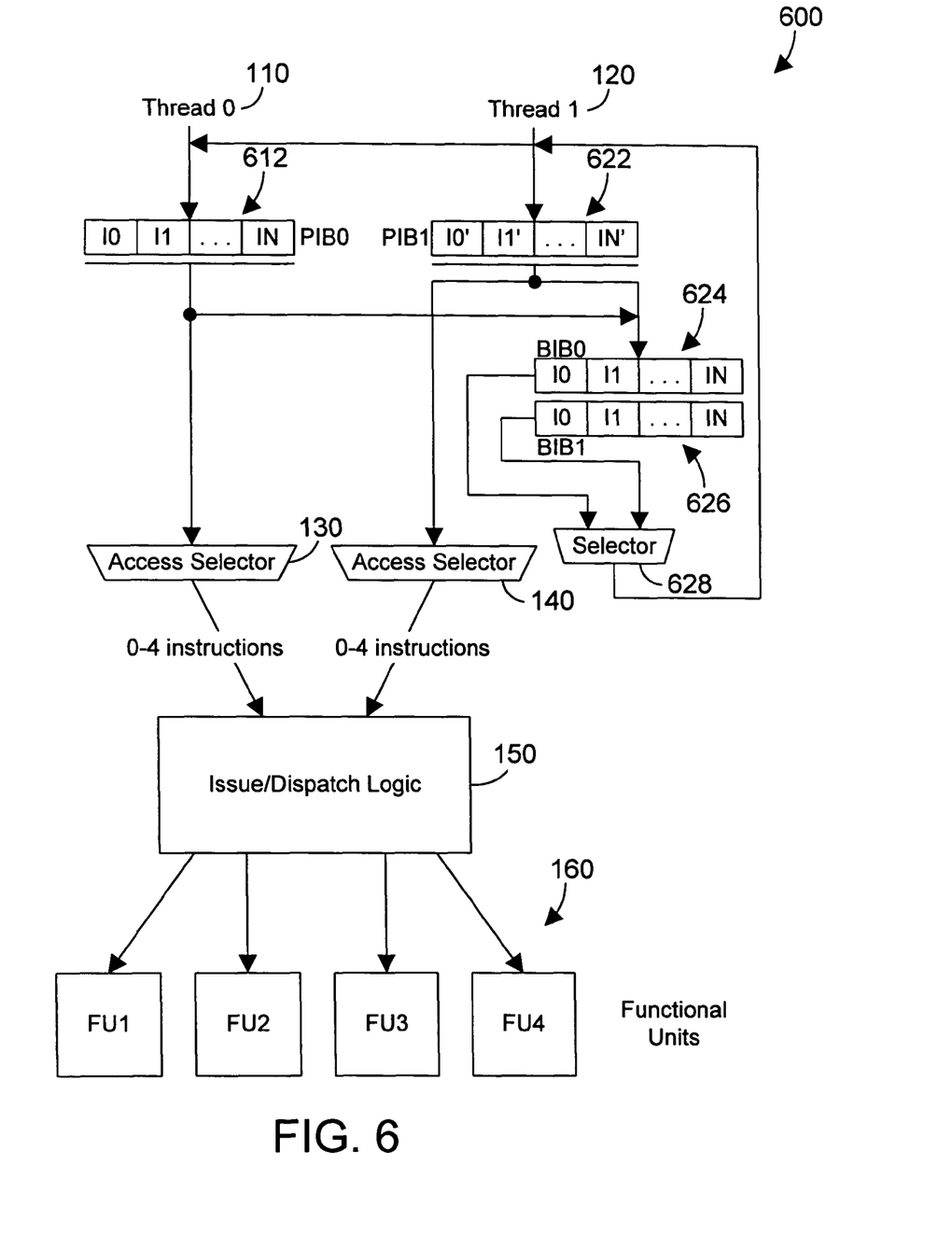
FIG. 6 is a block diagram of a processor in accordance with a third embodiment that includes a pool of backup instruction buffers corresponding to backup threads that may be swapped with any simultaneous thread.

Referring to FIG. 6, a processor 600 in accordance with a third embodiment of the present invention includes the access selectors 130, 140, the issue/dispatch logic 150, and the functional units 160 shown in FIGS. 1, 2 and 4. Processor 600 provides multiple backup threads in a configuration that allows any backup thread to be swapped with either primary thread. Primary thread 110 has a corresponding primary instruction buffer 612, and primary thread 120 has a corresponding primary instruction buffer 622. Note, however, that multiple backup instruction buffers 624 and 626 are grouped in a "pool" configuration that allows either primary thread to swap with any backup thread. This provides great flexibility in keeping the processor 600 executing as many instructions as possible. This embodiment contemplates any number of backup instruction buffers (including a single backup instruction buffer) in the "pool", and is not limited to the exemplary case of two backup instruction buffers 624 and 626 as shown in FIG. 6. When only a single backup instruction buffer in implemented, the single backup instruction buffer time multiplexed to logically provide a first backup instruction buffer and a second backup instruction buffer.

Figure 7:
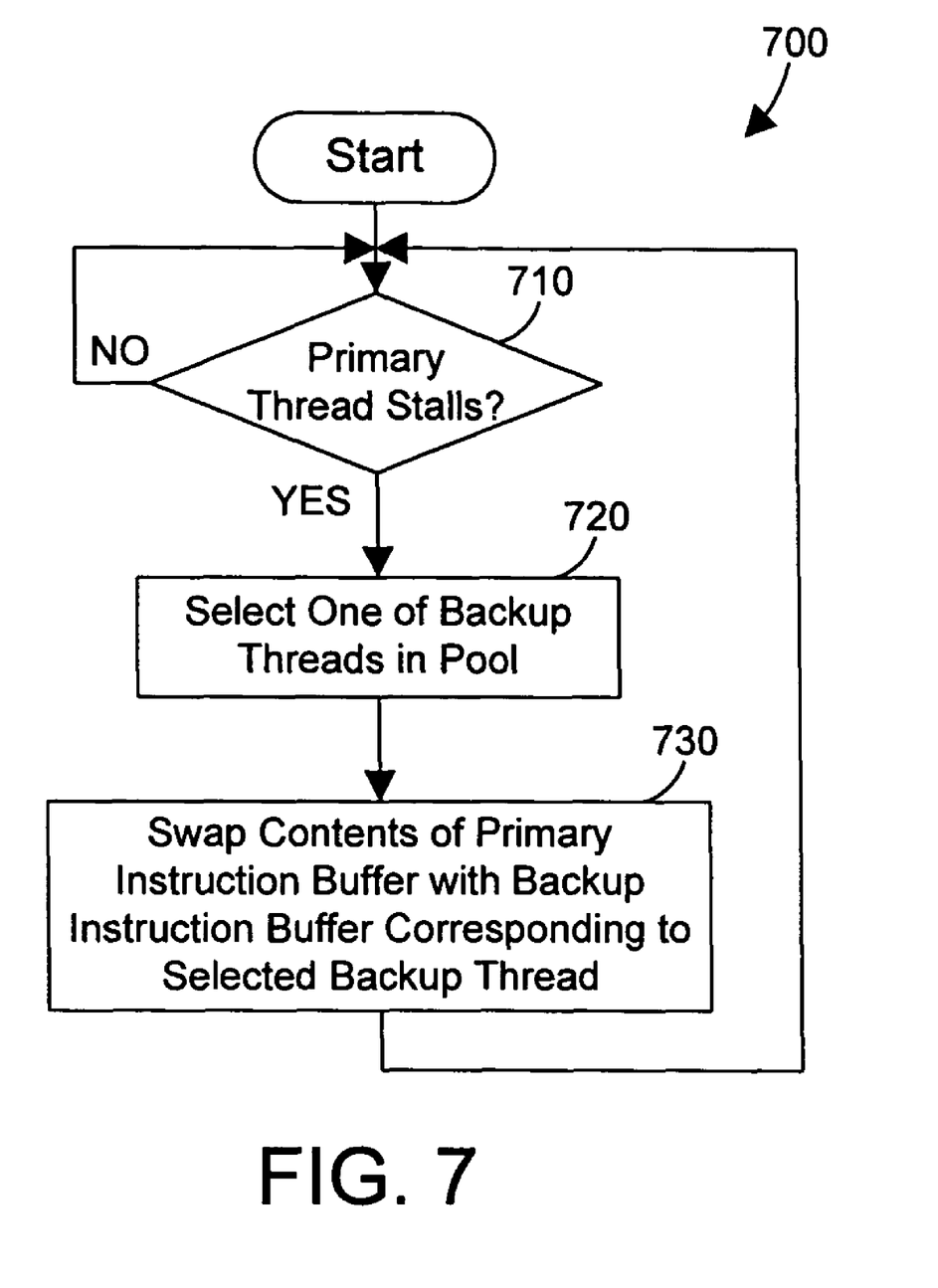
FIG. 7 is a flow diagram of a method in accordance with the third embodiment that is performed by the processor in FIG. 6.

A method 700 in accordance with the third embodiment is shown in FIG. 7. Method 700 waits (step 710=NO) until a primary thread stalls (step 710=YES). One of the backup threads in the pool is selected (step 720). The contents of the primary instruction buffer corresponding to the stalled thread is then swapped with the contents of the backup instruction buffer corresponding to the selected backup thread (step 730). Thus, if primary thread 110 stalls (step 710=YES), one of the backup threads in the pool is selected (step 720). We assume for the sake of illustration that the backup thread corresponding to the backup instruction buffer 626 is selected in step 720. The selection of backup thread drives the selector 628 to select the appropriate backup instruction buffer to feed back to the primary instruction buffers. The contents of the primary instruction buffer 612 are then swapped with the contents of the backup instruction buffer 626. In similar fashion, when the primary thread 120 stalls, the contents of its primary instruction buffer 622 may be swapped with any of the backup instruction buffers in the pool. In this manner, either primary thread may be swapped with any backup thread, rather than dedicating backup threads to certain primary threads, as shown in processor 200 of FIG. 2 and processor 400 of FIG. 4. Processor 600 thus provides a more flexible scheme for hybrid multithreading that includes two or more primary threads and any suitable number of backup threads in a pool that may be swapped with any primary thread.

The preferred embodiments provide a significant advance in the art by providing hybrid multithreading that defines two or more primary threads that may issue instructions simultaneously and by providing two or more backup threads for the primary threads. The hybrid multithreading of the preferred embodiments allows a processor to realize the benefits of simultaneous multithreading without the cost of making all threads simultaneous.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, instead of swapping the contents of the primary instruction buffer and a backup instruction buffer when a thread stalls, a selector could instead simply select between the primary instruction buffer and the backup instruction buffer(s) to execute a different thread.

What is claimed is:

1. An integrated circuit processor comprising:
   a first instruction buffer corresponding to a first primary thread;
   a second instruction buffer corresponding to a first backup thread;
   a thread switch mechanism that detects when the first primary thread stalls, and in response thereto, pauses thread execution while swapping instructions stored in the first instruction buffer with instructions stored in the second instruction buffer;
   a third instruction buffer corresponding to a second primary thread; and
   a fourth instruction buffer corresponding to a second backup thread;
   wherein the thread swap mechanism further detects when the second primary thread stalls, and in response thereto, pauses thread execution while swapping instructions stored in the third instruction buffer with instructions stored in the fourth instruction buffer.

2. The integrated circuit processor of claim 1 wherein execution of the backup thread occurs after the swap by executing at least one instruction in the first instruction buffer.

3. The integrated circuit processor of claim 1 wherein the first and second.

4. An integrated circuit processor comprising:
   a first primary instruction buffer corresponding to a first primary thread;
   a second primary instruction buffer corresponding to a second primary thread;
   wherein the first and second primary threads simultaneously issue instructions for execution;
   a first backup instruction buffer;
   a second backup instruction buffer;
   a thread switch mechanism that detects when one of the first and second threads stalls, and in response thereto, pauses thread execution while swapping instructions stored in one of the first and second primary instruction buffers corresponding to the stalled thread with instructions stored in one of the first and second backup instruction buffers.

5. The integrated circuit processor of claim 4 wherein the thread switch mechanism:
   (1) detects when the first primary thread stalls, and in response thereto, swaps the first primary instruction buffer with the first backup instruction buffer; and
   (2) detects when the second thread stalls, and in response thereto, swaps the second primary instruction buffer with the second backup instruction buffer.

6. The integrated circuit processor of claim 4 wherein the first and second backup instruction buffers are part of a pool of backup instruction buffers, wherein instructions in any backup instruction buffer in the pool may be swapped with instructions in the first primary instruction buffer, and wherein instructions in any backup instruction buffer in the pool may be swapped with instructions in the second primary instruction buffer.

7. An integrated circuit processor comprising:
   a first primary instruction buffer corresponding to a first primary thread;
   a second primary instruction buffer corresponding to a second primary thread;
   wherein the first and second primary threads simultaneously issue instructions for execution;
   a first backup instruction buffer;
   a second backup instruction buffer;
   a thread switch mechanism that detects when the first thread stalls, and in response thereto, pauses thread execution while swapping instructions stored in the first primary instruction buffer with instructions stored in the first backup instruction buffer, and begins issuing from the first primary instruction buffer, and that detects when the second thread stalls, and in response thereto, pauses thread execution while swapping instructions stored in the second primary instruction buffer with instructions stored in the second backup instruction buffer, and begins issuing from the second primary instruction buffer.

8. A method for switching between a first thread of execution and a second thread of execution in a multithreaded processor, the method comprising the steps of:
(A) providing a first instruction buffer corresponding to the first thread;
(B) providing a second instruction buffer corresponding to the second thread;
(C) pausing thread execution while swapping instructions stored in the first instruction buffer with instructions stored in the second instruction buffer;
(D) providing a third instruction buffer corresponding to a third thread;
(E) providing a fourth instruction buffer corresponding to a fourth thread; and
(F) pausing thread execution while swapping instructions stored in the third instruction buffer with instructions stored in the fourth instruction buffer.

9. The method of claim 8 wherein step (C) is performed when switching between the first thread and the second thread is required.

10. The method of claim 8 wherein step (C) is performed when the first thread stalls.

11. The method of claim 8 wherein step (C) is performed when the second thread stalls.

12. The method of claim 8 further comprising the step of executing the second thread after the swapping of instructions in step (C) by executing at least one instruction in the first instruction buffer.

13. The method of claim 8 wherein step (F) is performed when the third.

14. The method of claim 8 wherein step (F) is performed when the fourth.

15. The method of claim 8 wherein the first and third threads.

16. A method for switching between first and second threads of execution in a multithreaded processor, the method comprising the steps of:
(A) providing a first primary instruction buffer corresponding to the first thread;
(B) providing a second primary instruction buffer corresponding to the second thread;
(C) providing a first backup instruction buffer corresponding to a first backup thread;
(D) providing a second backup instruction buffer corresponding to a second backup thread;
(E) simultaneously issuing instructions from the first primary instruction buffer and from the second primary instruction buffer; and
(F) detecting when one of the first and second primary threads stalls, and in response thereto, pausing thread execution while swapping instructions stored in one of the first and second primary instruction buffers corresponding to the stalled thread with instructions stored in one of the first and second backup instruction buffers.

17. The method of claim 16 wherein step (E) comprises the steps of:
(1) detecting when the first primary thread stalls, and in response thereto, swapping information stored in the first primary instruction buffer with information stored in the first backup instruction buffer; and
(2) detecting when the second thread stalls, and in response thereto, swapping instructions stored in the second primary instruction buffer with instructions stored in the second backup instruction buffer.

18. The method of claim 16 wherein the first and second backup instruction buffers are part of a pool of backup instruction buffers,
wherein instructions in any backup instruction buffer in the pool may be swapped with instructions in the first primary instruction buffer, and wherein instructions in any backup instruction buffer in the pool may be swapped with instructions in the second primary instruction buffer.

19. A method for switching between threads of execution in a multithreaded processor, the method comprising the steps of:
(A) providing a first primary instruction buffer corresponding to the first thread;
(B) providing a second primary instruction buffer corresponding to the second thread;
(C) providing a first backup instruction buffer corresponding to a first backup thread;
(D) providing a second backup instruction buffer corresponding to a second backup thread;
(E) simultaneously issuing instructions from the first primary instruction buffer and from the second primary instruction buffer; and
(F) detecting when the first threads stalls, and in response thereto, pausing thread execution while swapping instructions stored in the first primary instruction buffer with instructions stored in the first backup instruction buffer, and issuing instructions from the first primary instruction buffer.

20. The method of claim 19 further comprising the step of
(G) detecting when the second thread stalls, and in response thereto, swapping instructions stored in the second primary instruction buffer with instructions stored in the second backup instruction buffer, and issuing from the second primary instruction buffer.

* * * * *